(12) United States Patent
Girlya et al.

(10) Patent No.: US 12,551,780 B2
(45) Date of Patent: Feb. 17, 2026

(54) AMUSEMENT ACTIVITY STATION

(71) Applicant: EPR Excavate, LLC, Kansas City, MO (US)

(72) Inventors: Ilya Girlya, West Berlin, NJ (US); Yan Girlya, West Berlin, NJ (US)

(73) Assignee: EPR Excavate, LLC, Kansas City, MO (US)

( * ) Notice: Subject to any disclaimer, the term of this patent is extended or adjusted under 35 U.S.C. 154(b) by 781 days.

(21) Appl. No.: 17/830,525

(22) Filed: Jun. 2, 2022

(65) Prior Publication Data
US 2023/0356065 A1 Nov. 9, 2023

Related U.S. Application Data

(63) Continuation-in-part of application No. 17/738,468, filed on May 6, 2022.

(51) Int. Cl.
*A63F 9/06* (2006.01)
*A63F 9/30* (2006.01)

(52) U.S. Cl.
CPC .............. *A63F 9/0666* (2013.01); *A63F 9/30* (2013.01); *A63F 2009/0668* (2013.01)

(58) Field of Classification Search
CPC .. A63F 9/0666; A63F 2009/0668; A63F 9/30; A63F 9/02
See application file for complete search history.

(56) References Cited

U.S. PATENT DOCUMENTS

D208,903 S    10/1967  Zadron et al.
4,457,722 A    7/1984  Housand
(Continued)

FOREIGN PATENT DOCUMENTS

FR    2627702 A  *  9/1989
GB    2487483 A  *  7/2012  ............... A63F 9/06
(Continued)

OTHER PUBLICATIONS

Diggerland field trip, Super Simple Play with Caltie Youtube Channel video, date May 30, 2019, site visited Apr. 9, 2024, https://www.youtube.com/watch?v=eFtPOHgGoUo.
NPL Facebook, Diggerland USA facebook image date Jun. 8, 2022, site visited Apr. 9, 2024, https://www.facebook.com/photo/?fbid=3287297954848935&set=a014097257859395048&locale=ms_MY.

*Primary Examiner* — Raleigh W Chiu
(74) *Attorney, Agent, or Firm* — Stinson LLP

(57) ABSTRACT

An amusement activity station enables a user to operate complex machinery to pick up and position selectively shaped objects in a safe and amusing manner. The amusement activity station includes a complex machine component and at least one object-receiver station. The complex machine includes a user position station, a user-to-machine interface, a moveable member, and a pick-up mechanism. The moveable member is maneuvered relative to the user position station by way of manual operation of the user-to-machine interface. Each object-receiver station includes at least one object-receiving structure. The pick-up mechanism and moveable member are directable for picking up and conveying selectively shaped objects toward the object-receiving structure(s) for positioned placement. The amusement activity station contemplates any number of shapes and sizes of the object-receiving stations and selectively shaped objects, including basically shaped objects and stations as well as irregularly shaped objects and stations.

15 Claims, 13 Drawing Sheets

(56) References Cited

U.S. PATENT DOCUMENTS

| | | | |
|---|---|---|---|
| D277,119 S | 1/1985 | Paczko | |
| D277,203 S | 1/1985 | Paczko | |
| 4,846,692 A * | 7/1989 | Delcambre | G09B 1/06 |
| | | | 434/259 |
| D338,923 S | 8/1993 | Ran | |
| D361,102 S | 8/1995 | Larsen | |
| D375,332 S | 11/1996 | Kino | |
| D457,313 S | 5/2002 | Clark | |
| D466,957 S | 12/2002 | Visnick | |
| D544,176 S | 6/2007 | Rubin | |
| D740,501 S | 10/2015 | Taylor | |
| D903,213 S | 11/2020 | Nam | |
| D974,493 S | 1/2023 | Huang | |
| D984,804 S | 5/2023 | Zhang | |
| 2003/0045204 A1 | 3/2003 | Chan | |
| 2004/0029088 A1 * | 2/2004 | Forbes | G09B 21/00 |
| | | | 600/300 |
| 2021/0252419 A1 | 8/2021 | Vicentelli | |
| 2022/0062750 A1 * | 3/2022 | Pogosyan | A63F 9/0666 |
| 2022/0226696 A1 * | 7/2022 | Thiam | A63F 9/0666 |
| 2023/0356065 A1 * | 11/2023 | Girlya | A63F 9/30 |

FOREIGN PATENT DOCUMENTS

| | | | | |
|---|---|---|---|---|
| KR | 20220140287 A | * | 10/2022 | A63F 9/12 |
| WO | 212439 | | 2/2021 | |

\* cited by examiner

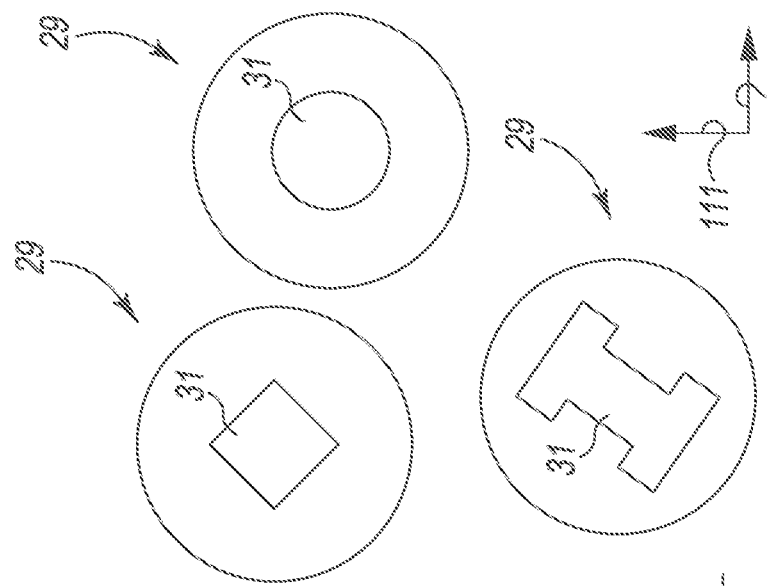
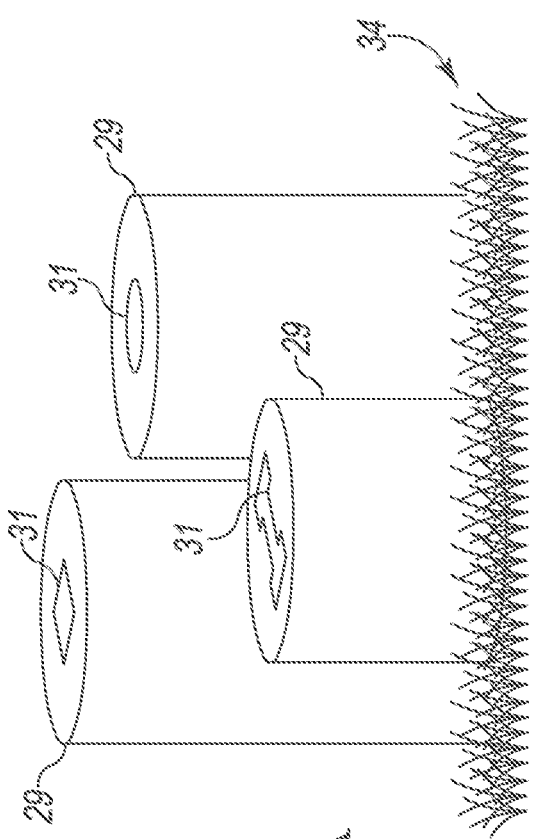
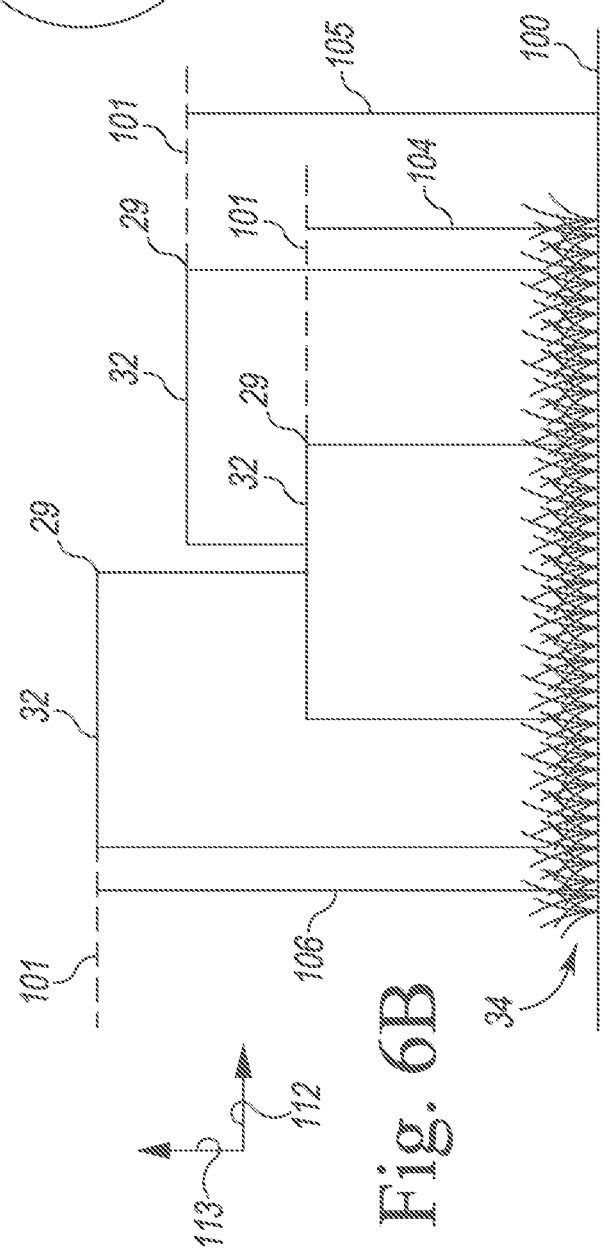
Fig. 6A
Fig. 6B
Fig. 6C

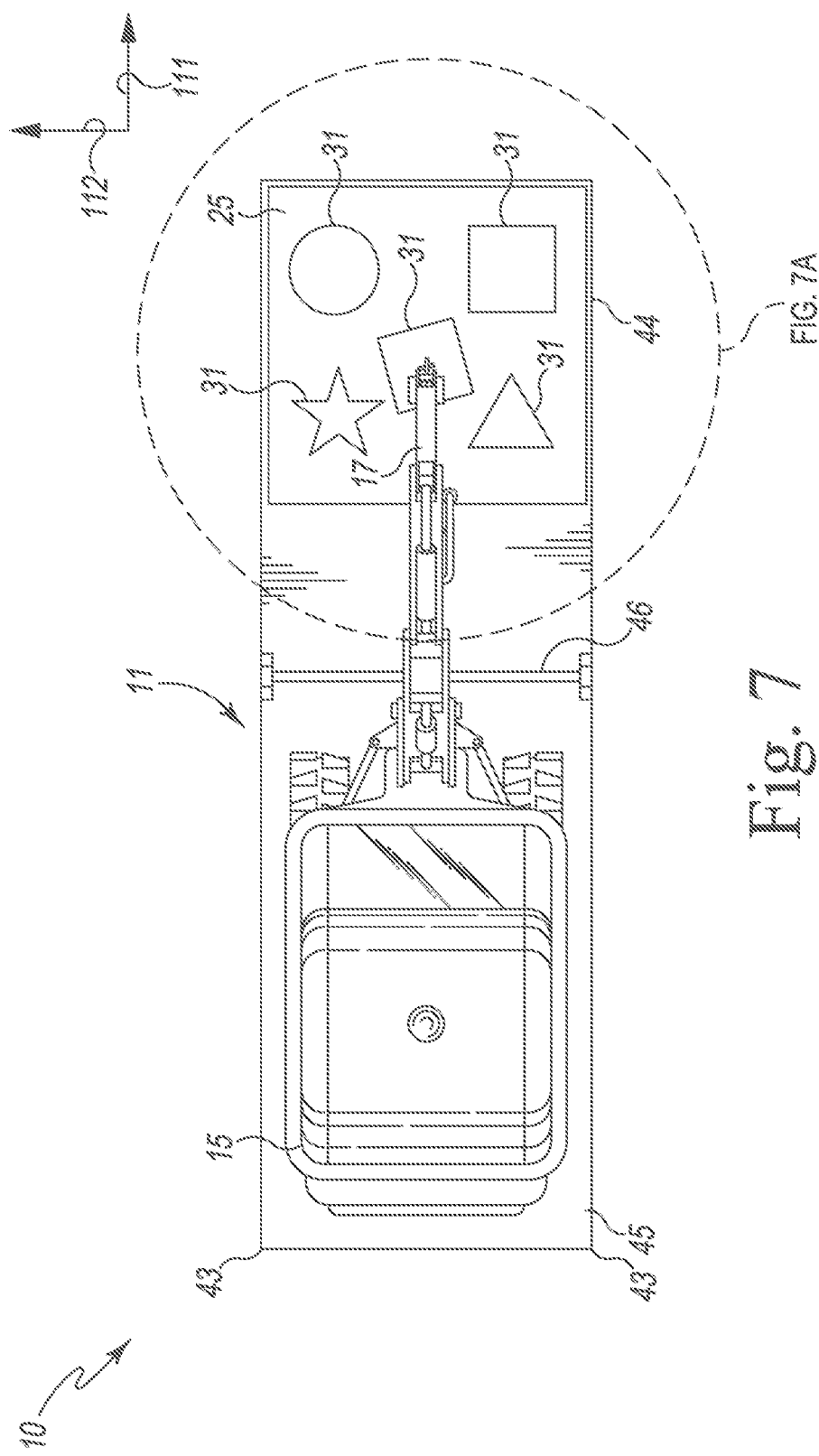

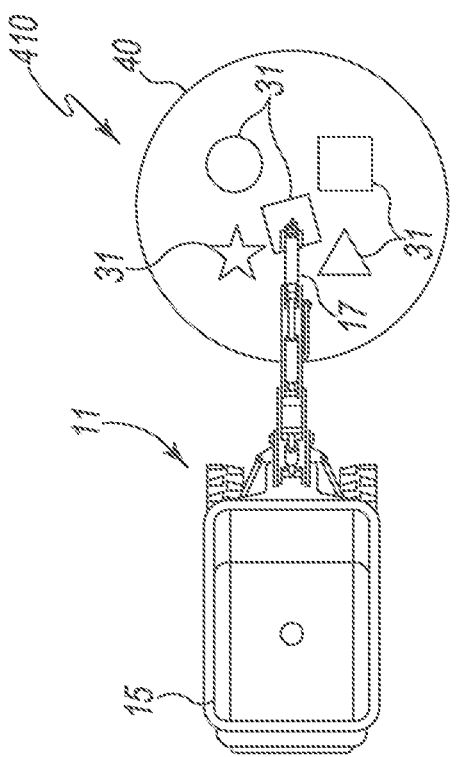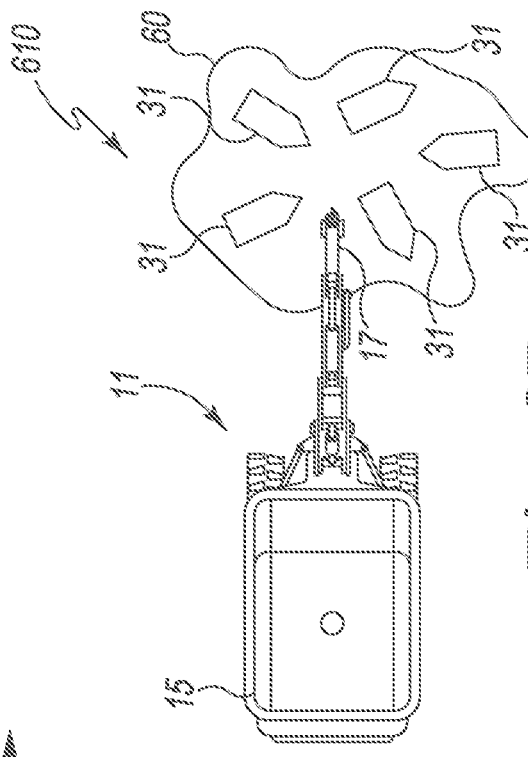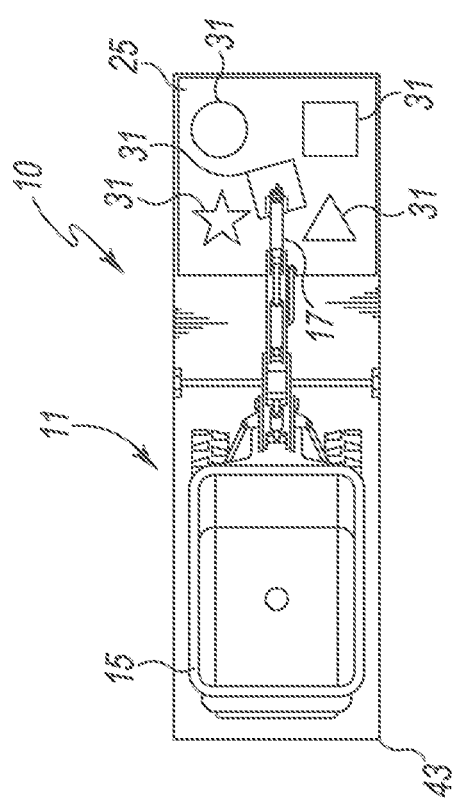

AMUSEMENT ACTIVITY STATION

PRIOR HISTORY

This application is a Continuation-in-Part patent application of pending U.S. patent application Ser. No. 17/738,468 filed in the United States Patent and Trademark Office on 6 May 2022, the specifications and drawings of which are hereby incorporated by reference.

FIELD OF THE INVENTION

The present invention generally relates to an amusement park activity. More particularly, the present invention relates to amusement activity or game station by way of which user participants may operate complex machinery to particularly position select objects at a primary object receiver station by way of a moveable arm or arm-like member of the complex machinery.

BRIEF DESCRIPTION OF THE PRIOR ART

Amusement parks and theme parks continuously face challenges attracting return visitors and new visitors. Past visitors may elect to not return, and potential new visitors may elect to not travel to a park that, in their opinion, does not regularly offer guest experience components that are new, innovative or different relative to those of other parks. To be successful, amusement or theme park owners perceive a need to regularly introduce new, innovative and fun guest experiences. A primary objective according to the present invention is to provide an amusement activity or game station that is new, innovative, fun and different relative to prior art attractions.

An additional objective of the present invention is to provide an amusement attraction that is sufficiently mobile to be transported (including by any truck, tractor or other vehicle, machine, vessel or container, or any combination thereof) such as for use in or by a temporary or traveling carnival or amusement event or location, or at any other temporary location such as a parking area or common area of a commercial (e.g., office, warehouse or mixed-use), retail (e.g., mall or other shopping center) or institutional (e.g., governments, school hospital, heath care, etc.) property, such as for a temporary amusement attraction as part of a gathering, party, fundraiser or other event.

A first exemplary amusement attraction is referenced in U.S. Pat. No. 10,166,485 ('485 Patent) authored by Girlya et al. and owned by Diggerland USA, LLC in West Berlin, New Jersey. The '485 Patent describes an amusement ride, attraction or device comprising a modified vehicle, machine, vessel, container, load-carrying platform or similar device, or any combination thereof, or anything having the appearance thereof, which is used, useful or operated for mining, transportation, military or construction or other commercial or industrial uses, purposes or applications. Illustrative embodiments of the invention include a modified dump trailer, dump truck or load-carrying platform. Such a modified dump trailer includes a dump trailer modified so as to permit a horizontally-pivoting telescoping hydraulic cylinder to raise and lower the front of the modified dump trailer, which is modified with a passenger support system and a passenger restraint system. Associated processes, systems and methods include a power pack or other dedicated source of energy and an adjacent entrance/exit ramp and boarding/de-boarding platform and operator control platform.

A second exemplary amusement attraction is referenced in U.S. Pat. No. 10,946,296 ('296 Patent) also authored by Girlya et al. The '296 Patent describes an amusement ride that provides user participants with the sensation of riding scissor lift construction equipment. The amusement ride has a scissor lift mechanism supported by a construction equipment frame with wheels thereon. A stationary support structure supports the equipment frame and suspends the wheels in midair to hold the equipment stationary. A cargo lift platform connected on top of the scissor lift mechanism has amusement ride seats mounted thereon. The ride seats have passenger restraints which provides amusement-ride-level safety. An electric motor drivingly connected to the scissor lift mechanism is operated by a ride operator to raise and lower the cargo lift platform. A passenger access platform situated adjacent the cargo lift platform allows ride passengers to easily and safely enter and exit the scissor lift.

From a consideration of the foregoing prior art examples, it will be noted that the prior art perceives a need for an amusement attraction that, instead of being passively ridden by a park guest, offers an opportunity to enable user participants to individually operate complex or heavy machinery in a safe, amusing manner. More particularly, the prior art perceives a need for an amusement activity or game station for enabling a user to operate complex machinery to pick up and position selectively shaped objects at an object receiver station and thereby improve or maintain operable complex machinery object placement skills as summarized in more detail hereinafter.

SUMMARY OF THE INVENTION

As prefaced above, a primary objective of this invention is the provision of an amusement activity or game station for generally offering user participants an opportunity to individually operate machinery in a safe, amusing or entertaining manner. The presently disclosed subject matter enables a user to operate complex machinery to pick up and direct selectively shaped objects toward an object receiver station at which station the selectively shaped objects may be particularly positioned. The amusement activity or game station according to the present invention thus generally amuses or entertains user participants while more particularly enabling user participants to improve or maintain operable complex machinery object placement skills. The amusement activity or game station according to the present invention may be said to essentially comprise a complex machine, an object placement or receiving station, and a number of selectively shaped objects.

The complex machine according to the present invention preferably comprises a user position station, a user-to-machine interface, and a moveable member. The moveable member is movable relative to the user position station by way of the user-to-machine interface as manually operated by the user. The object receiver station is positioned opposite the complex machine and preferably comprises a number of object-receiving structures at which structures the selectively shaped objects may be held and/or positioned. The moveable member of the complex machine is directable for picking up the selectively shaped objects, moving the selectively shaped objects into position at the object receiver station, and finally positioning the selectively shaped object at the object receiving structures.

Each object-receiver station comprises at least one object-receiving structure. The moveable member is directable for firstly picking up the selectively shaped objects by way of the pick-up mechanism and secondly directing the selectively shaped objects toward the at least one object-receiving structure. The object-receiving structures are sized and shaped to cooperably receive the selectively shaped objects. In a preferred embodiment, the pick-up mechanism may be characterized by a loop member, but other pick-up mechanisms are contemplated. The loop member is attached to the moveable member, and is operable to couple with hook members cooperably associated with the selectively shaped objects.

Further, the preferred embodiment may preferably comprise a single object-receiver station outfitted with a number or series of object-receiving structures spaced and formed within an object-receiving overlay structure. The object-receiving overlay structure is preferably supported by an object support platform or pedestal. A first or upper surface of the object support platform or pedestal provides an object support surface at each object-receiving structure in this embodiment.

Each object-receiving structure at the object-receiver station(s) comprises a receiver axis that generally corresponds to the vectored direction of final object placement. The receiver axis of each object-receiving structure extends in a select angle relative to a station support surface. The select angle may be said to be selected from the group consisting of a zero angle, an oblique angle, and an orthogonal angle. The select angle is parallel to the station support surface at the zero angle; the select angle is oblique to the station support surface at the oblique angle; and the select angle is orthogonal to the station support surface at the orthogonal angle. The selectively shaped objects may be directed and received at various angles as supported by the object-receiver stations according to the present invention.

The selectively shaped objects each essentially comprise a select object size and a select object shape in first and second dimensions. The object-receiving structures comprise corresponding select object-receiving shapes and select object-receiving sizes. The select object-receiving sizes are greater than the select object sizes, and the select object-receiving shapes are substantially similar to the select object shapes. The user participant may thus direction the selectively shaped objects toward the receiver station(s) and each selectively shaped object may be preferably associated with a singular object-receiving structure at the object-receiver station. The sizing of the variously shaped object-receiving structures may be tailored to increase or decrease skill level of object placement at the object-receiver stations.

The object-receiver stations according to the present invention may be variously configured for receiving the selectively shaped objects. For example, a series of object support surfaces may be provided, which series of object support surfaces are variously distanced from a station support surface. Alternatively, a series of object-receiver stations may be provided, each of which may comprise one or more object support surface. The object support surfaces of the series of object-receiver stations may be variously spaced or uniformly spaced from a station support surface. The object-receiver stations may be suspended above a station support surface. In the case of a suspended object-receiver station, the station may be suspended by a series of tensile elements from an object-receiver station ceiling.

The station platform may further preferably comprise a fixedly attached portion divider. The fixedly attached portion divider extends upwardly intermediate a receiver station portion and a machinery support portion for preventing the complex machinery from being inadvertently directed into the object-receiver station. The complex machine is preferably coupled or anchored to the fixedly attached portion divider thereby fixing the complex machine in position relative to the station platform. The station platform is further preferably fixedly attached or anchored to an underlying anchor support surface for fixing or anchoring the entire amusement activity or game station to the underlying anchor support surface.

Other secondary objects of the present invention, as well as particular features, elements, and advantages thereof, will be elucidated or become apparent from, the following brief descriptions of the drawings and the accompanying drawing figures.

BRIEF DESCRIPTIONS OF THE DRAWINGS

Other features and objectives of the invention will become more evident from a consideration of the following brief descriptions of patent drawings.

FIG. 6A is a front top perspective view of a series of barrel-shaped object-receiver stations grouped together upon a station support surface outfitted with grass-like material to depict a first-themed object-receiver station setting.

FIG. 6B is a front elevational view of the series of barrel-shaped object-receiver stations otherwise shown in FIG. 6A.

FIG. 6C is a top plan view of the series of barrel-shaped object-receiver stations otherwise shown in FIG. 6A shown with variously shaped object-receiving structures.

FIG. 7 is a first top plan view of the basic amusement game station according to the present invention showing the complex machine and the preferred object-receiver station supported by the station platform.

FIG. 8A is a second top plan view of the basic amusement game station according to the present invention showing the complex machine and the preferred object-receiver station supported by the station platform.

FIG. 8B is a top plan view of a fourth alternative amusement game station according to the present invention showing the complex machine and a fourth alternative object-receiver station and shown in side-by-side relation to FIG. 8A for comparative purposes.

FIG. 8C is a top plan view of a fifth alternative amusement game station according to the present invention showing the complex machine and a fifth alternative object-receiver station and shown in side-by-side relation to FIG. 8A for comparative purposes.

FIG. 8D is a top plan view of a sixth alternative amusement game station according to the present invention showing the complex machine and a sixth alternative object-receiver station and shown in side-by-side relation to FIG. 8C for comparative purposes.

DETAILED DESCRIPTION OF THE PREFERRED EMBODIMENT

Figure 1:
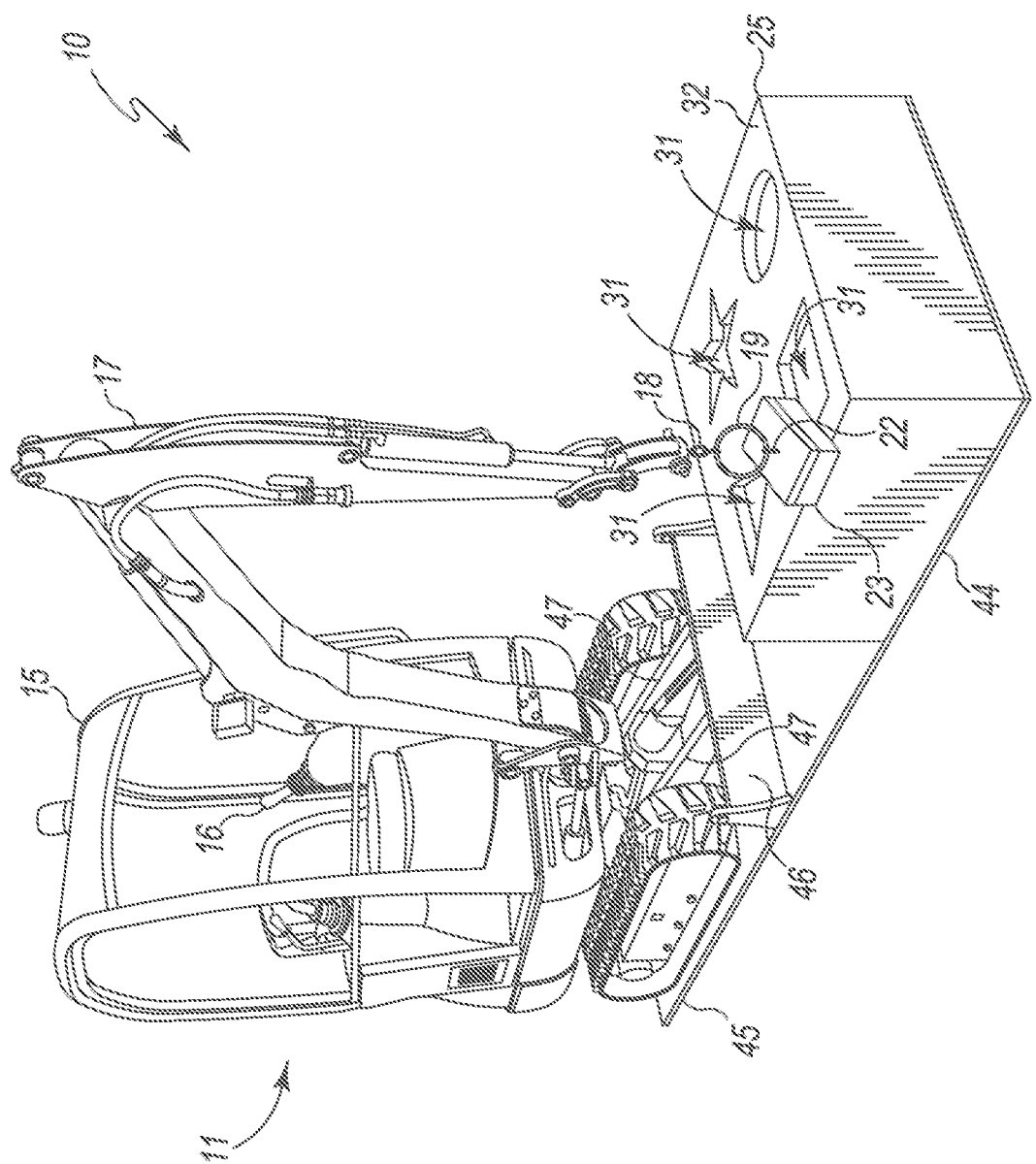
FIG. 1 is a perspective view of a basic amusement game station according to the present invention showing a complex machine and an object-receiver station supported by a station platform.

Referring now to the drawings with more specificity, the following specifications generally describe an amusement activity or game station or amusement activity for amusement park type facilities. The amusement activity or game station according to the presently disclosed subject matter basically provides an amusement activity enthusiast or participant user with an opportunity to operate complex machinery as variously exemplified to pick up and position selectively shaped objects at an object-receiver or object-placement station outfitted with certain structure configured to receive or hold the selectively shaped objects. The amusement activity or game station according to the present invention, in some embodiments, enables participants to exhibit, maintain or improve operable complex machinery-based object placement skills. In other words, the amusement activity or game station according to the present invention enables a user to learn how to operate complex machinery in order to safely and skillfully interact with environmental objects in the periphery of the complex machinery in a manner that is amusing.

Figure 2:
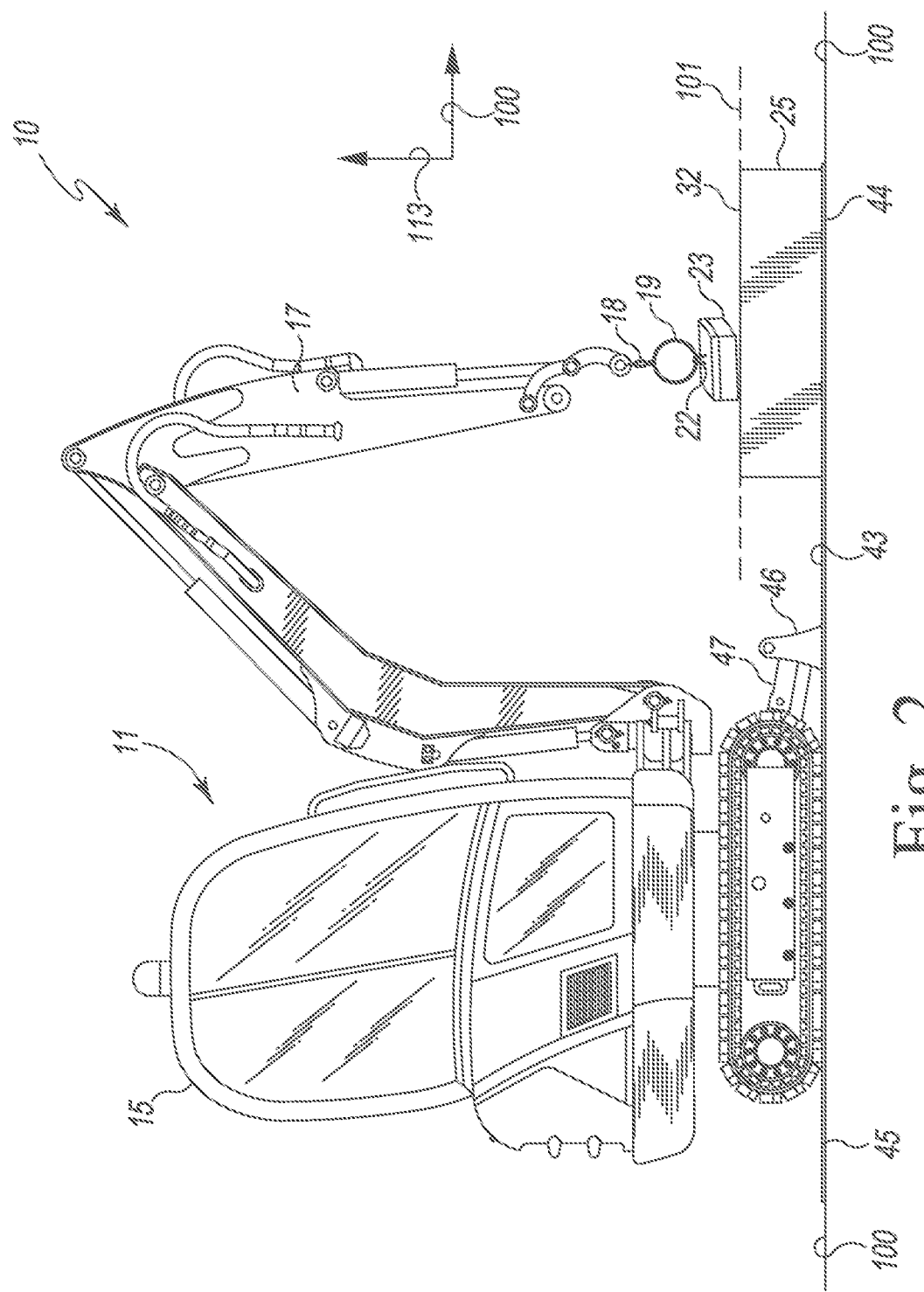
FIG. 2 is a lateral elevational view of the basic amusement game station according to the present invention showing the complex machine and the object-receiver station supported by the station platform with a selectively shaped object shown in perspective in superior adjacency to the object-receiver station held aloft by a moveable member of the complex machine and a coupling mechanism.
Figure 3:
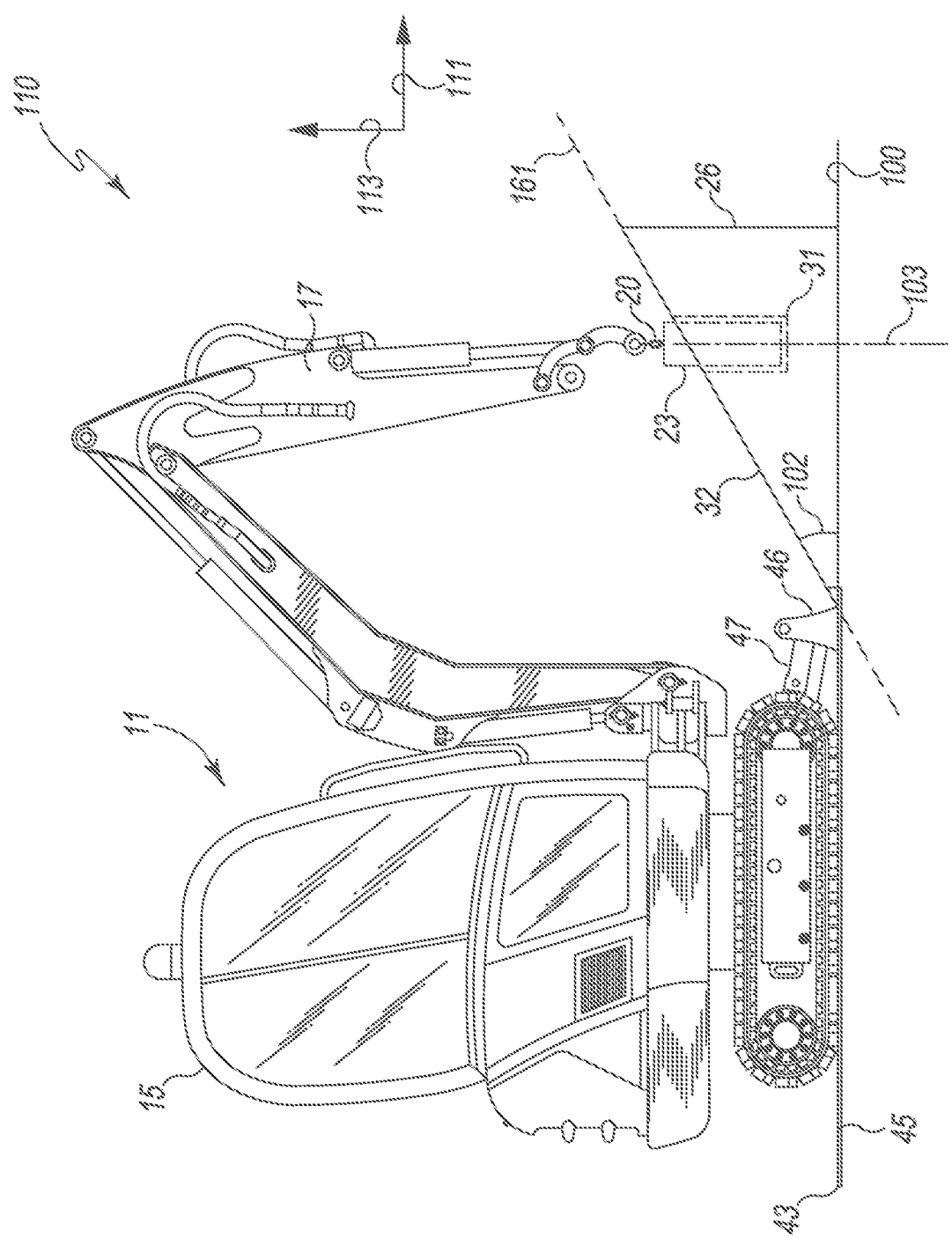
FIG. 3 is a lateral elevational view of a first alternative amusement game station according to the present invention showing the complex machine and a first alternative object-receiver station supported by the station platform with a selectively shaped object shown vertically received by the first alternative object-receiver station.
Figure 7A:
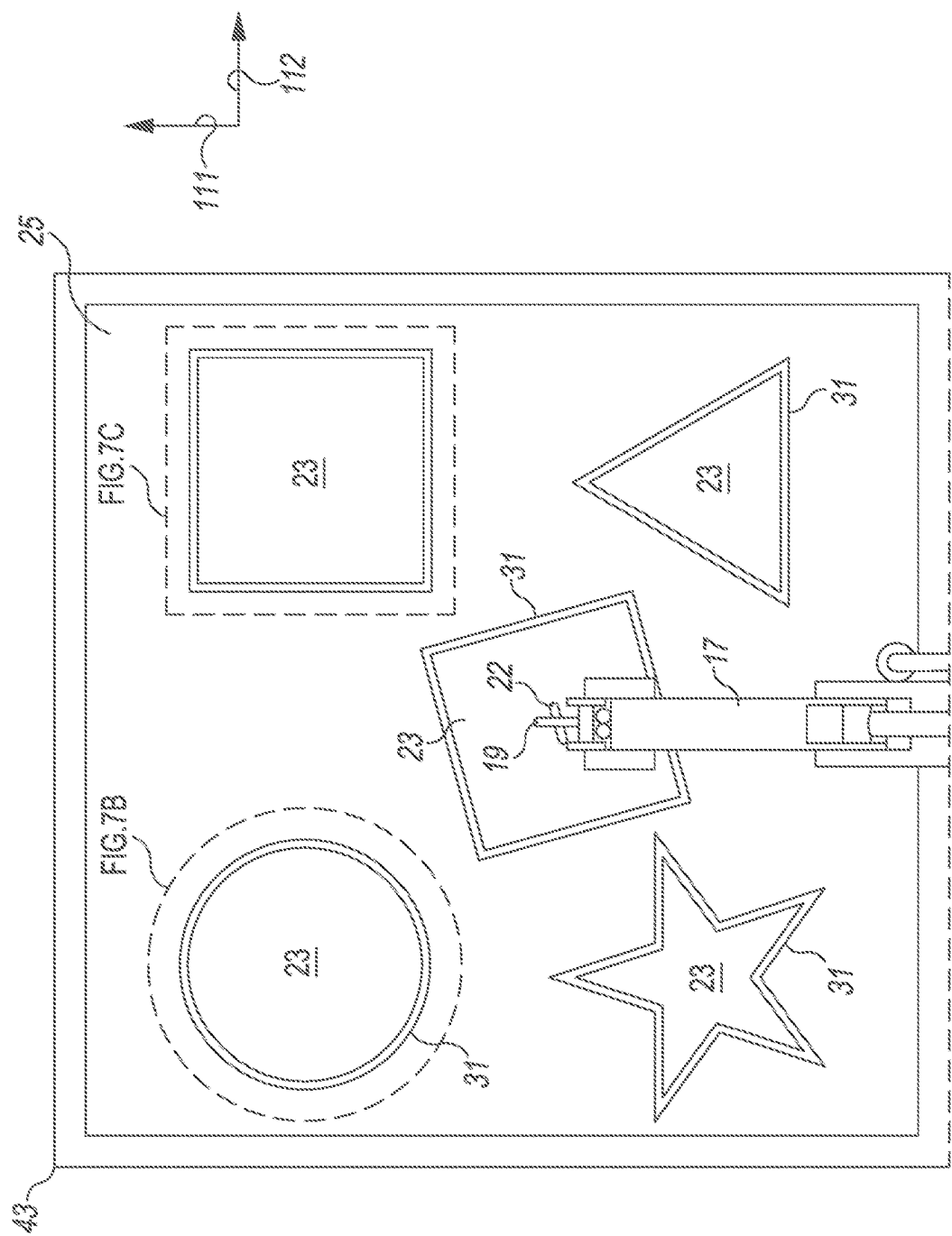
FIG. 7A is an enlarged sectional view as enlarged and sectioned from FIG. 7 to show in greater detail the preferred object-receiver station.
Figure 10B:
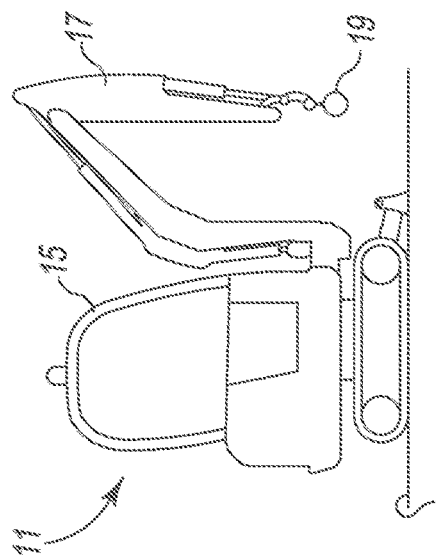
FIG. 10B is a reduced side elevational view of a second alternative complex machine as an alternative to the preferred complex machine otherwise depicted in FIG. 10D.
Figure 10A:
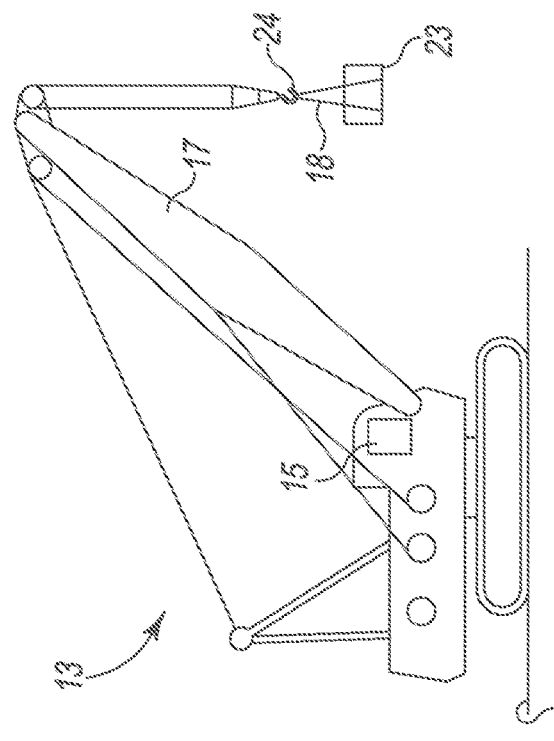
FIG. 10A is a reduced side elevational view of a first alternative complex machine as an alternative to the preferred complex machine otherwise depicted in FIG. 10D.
Figure 10D:
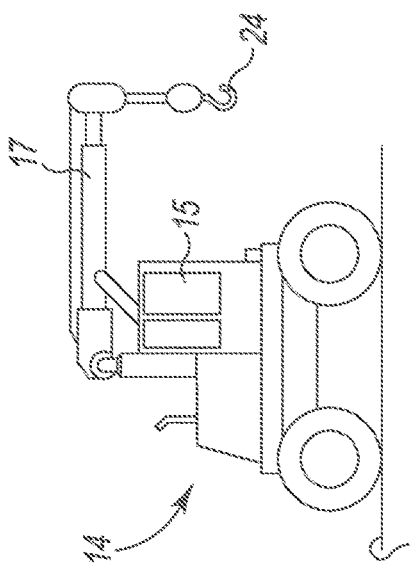
FIG. 10D is a reduced side elevational view of the preferred complex machine shown juxtaposed on the same sheet with FIGS. 10A-10C for comparative purposes.
Figure 10C:
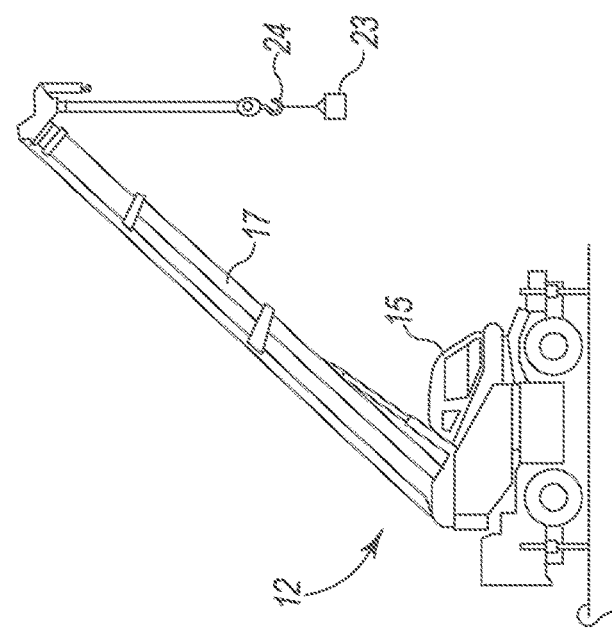
FIG. 10C is a reduced side elevational view of a third alternative complex machine as an alternative to the preferred complex machine otherwise depicted in FIG. 10D.

A preferred amusement game station according to the present invention is generally depicted and referenced at 10 in FIGS. 1, 2, and 7. Comparatively referencing FIGS. 1, 2, and 7, the reader will there firstly consider a mini-excavator type complex machine 11 of the amusement game station 10. While the preferred amusement game station 10 depicts a mini-excavator type complex machine 11 component in FIGS. 1, 2, and 7, it is contemplated the essential inventive concept of the amusement game station 10 may be practiced by any number of complex machines as generally and comparatively further depicted in FIGS. 10A-10D. In other words, other types of heavy machinery or complex machines could conceivably replace the mini-excavator type complex machine 11 and still be within the spirit of the subject invention. Other complex machine components are exemplified by various cranes as generally and respectively depicted and referenced at 12 and 13 in FIGS. 10A and 10B or a heavy lifting machine 14 as in FIG. 10D.

The complex nature of the complex machine component of the amusement game station adds a certain amusing effect to the amusement game station as user participants are seldom otherwise exposed to complex machines of that type. The amusement game station 10 according to the present invention affords participants with an opportunity to operate the complex machinery in a manner that is safe and amusing. It is contemplated that the complex machines generically depicted and referenced at 11, 12, 13, and 14 according to the present invention may essentially comprise a user or participant position station as at 15; a participant or user-to-machine interface as exemplified by one or more manual control(s) 16, and a moveable member or arm as at 17.

It is to be understood that the complexity of such exemplary heavy equipment typically also comprises power systems, hydraulic systems, transmission systems, and other mechanical systems that help a user fully operate the machinery. These support systems help support the key features enumerated or listed above and basically support the overall amusing effect of the subject invention. To enhance the amusing effect of the subject invention, it is contemplated the moveable (arm) member 17 (or other separate support structure adjacent the complex machine 11 or amusement game station 10) may be further preferably outfitted with one or more cameras (not specifically illustrated) capable of at least capturing visual images from participant activity to further enhance the overall amusing experience of the user-participant(s).

The moveable member or arm 17 is movable relative to the user position station 15 (e.g. a cab) by way of the user-to-machine interface 16 exemplified by manually operable controls that are manually operated by the participant or user to move or direct the moveable member 17. A pick-up mechanism is preferably attached to the end of the moveable member or arm 17 for enabling the participant to pick-up selectively shaped objects 23 and transfer those selectively shaped objects into position for placement at an object-receiver or object-placement station 25 positioned in spaced relation to the complex machine 11. In some embodiments, the object-receiver station 25 is opposite the complex machine 11. In a preferred embodiment, the pick-up mechanism is characterized by a loop member 19 attached to the moveable member 17 by way of one or more tether-type linkage element(s) as at 18.

The tether-type linkage element 18 is preferably pivotally attached to the moveable member 17 and (removably or fixedly) attached to the loop member 19. In a preferred embodiment the loop member 19 may be directed toward hook members 22 that are attached to and extend upwardly/outwardly from the selectively shaped objects 23 as generally depicted and referenced in FIGS. 1, 2, and 11. The loop member 19 may be used to mate or couple with the hook member(s) 22 in order for the participant to relatively easily pick up the selectively shaped objects 23. The hook members 22 may be preferably attached to the selectively shaped objects by way of a bracket-type bifurcated interface element as at 48. The bifurcated interface element 48 couples the hook element 22 to the at least one selectively shaped object 23 for improving balance of the at least one selectively shaped object relative to the hook element 22.

In an alternative embodiment, it is contemplated that the moveable member 17 may be outfitted with a hook member as generally depicted and referenced at 24 to couple with loop members or looping structure cooperably associated with the selectively shaped objects 23. Alternatively, the moveable member 17 may be outfitted with a relatively complex pincher type mechanism to grab objects or a relatively simpler linkages (as at 20 or 21) attached to both the moveable member 17 and the selectively shaped objects 23 for directing and placing objects. The preferred loop member 19 and hook members 22 are low cost, simple structures that are incorporated into the amusement game station 10 to achieve the basic function of a simple coupling action for effecting movement of the selectively shaped objects 23.

As prefaced above, the preferred amusement game station 10 according to the present invention further preferably comprises an object-receiver or object-placement station as at 25. The object-receiver or object-placement station 25 is positioned or situated opposite the complex machine 11 as perhaps best illustrated in FIGS. 2 and 7. The object-receiver or object-placement station 25 preferably comprises at least one, but preferably a series of object-receiving structures 31, which object-receiving structures 31 are sized and shaped to receive the selectively shaped objects 23. As illustrated the object-receiving structures 31 are essentially cavities or female formations that are dimensioned or sized and shaped to receive the selectively shaped objects 23.

The moveable member or arm 17 is firstly directable for enabling participants to first pick up the selectively shaped objects 23 via a pick-up mechanism as variously exemplified, and secondly directable or re-directable to place the selectively shaped objects 23 in or at the object-receiving structures 31. Although the selectively shaped objects 23 all appear to be male type structures insertable into female object-receiving structures 31, it is conceivable that objects having female characteristics (e.g. rings) could be picked-up and placed upon object-receiving structures having male characteristics (e.g. posts) at the object-receiving station.

Comparatively referencing FIGS. 2, 3, 4, and 5, the reader will there see several alternative object-receiver or object-placement stations as variously referenced at 25, 26, 27, and 28. In a preferred embodiment, the object-receiver station 25 is supported by a station support surface as at 100 and comprises an upper station surface 32 that extends in an upper station surface plane 101 parallel to the station support surface 100. In a first alternative embodiment, the object-receiver station 26 comprises an upper station surface 32 that extends in an upper station surface plane 101 angled obliquely as at angle 102 relative to the station support surface 100.

Figure 4:
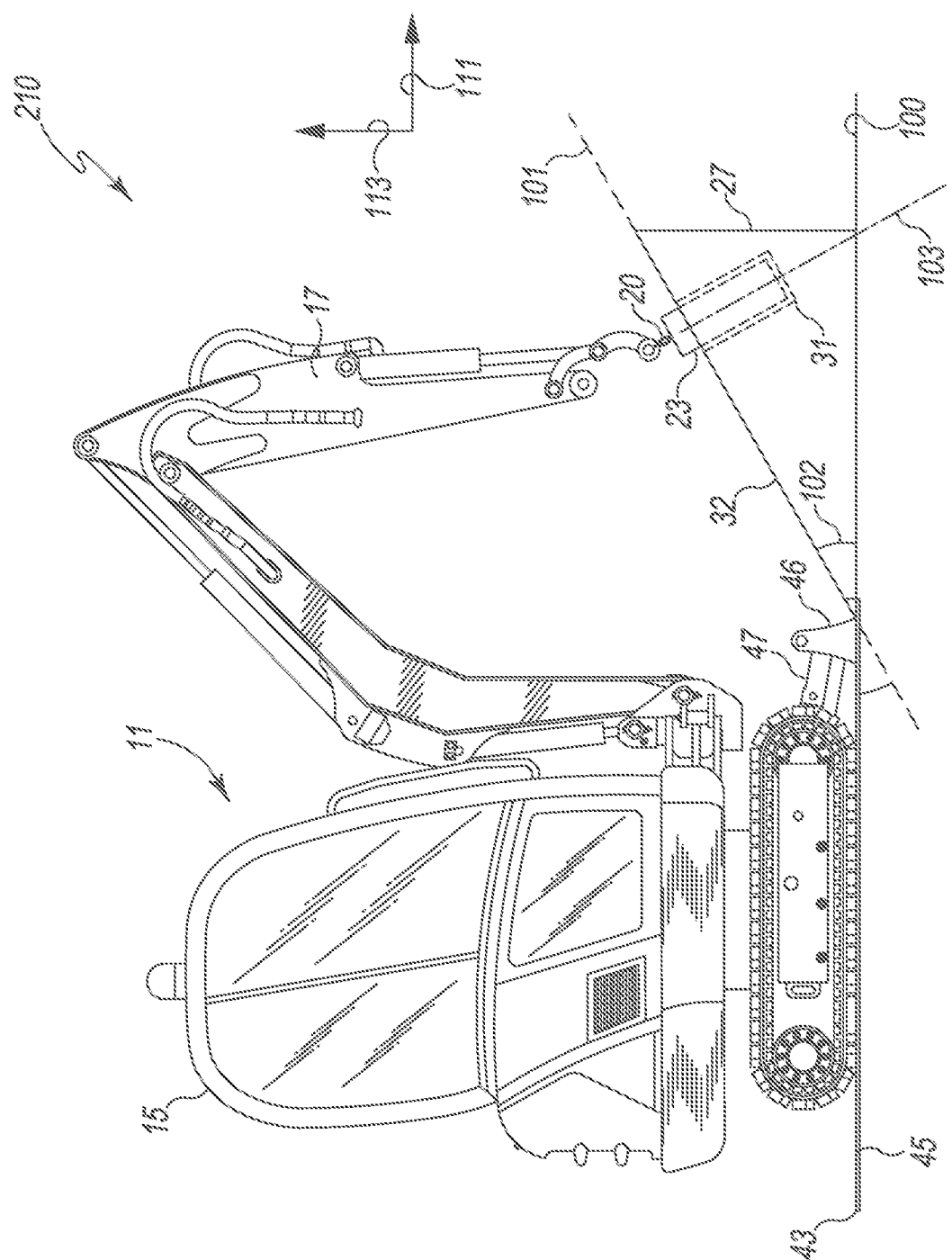
FIG. 4 is a lateral elevational view of a second alternative amusement game station according to the present invention showing the complex machine and a second alternative object-receiver station supported by the station platform with a selectively shaped object shown obliquely received by the second alternative object-receiver station.

The second alternative object-receiver station 27 depicted in FIG. 4 is substantially similar to the first alternative object-receiver station 26. The primary difference between the second alternative object-receiver station 27 and the first alternative object-receiver station 26 is the axis angles of the object-receiving structure(s) 31 relative to surrounding structure. In other words, the object-receiving structure 31 of the second alternative object-receiver station 27 comprises a receiver axis 103 that is orthogonal to the upper station surface plane 101 as compared to the receiver axis 103 of the object-receiving structure 31 of the first alternative object-receiver station 26 that is obliquely angled relative to the upper station surface plane 101. Given these structural differences, the first alternative object-receiver station 26 coincides with a first alternative amusement game station 110 and the second alternative object-receiver station 27 coincides with a second alternative amusement game station 210.

Figure 5:
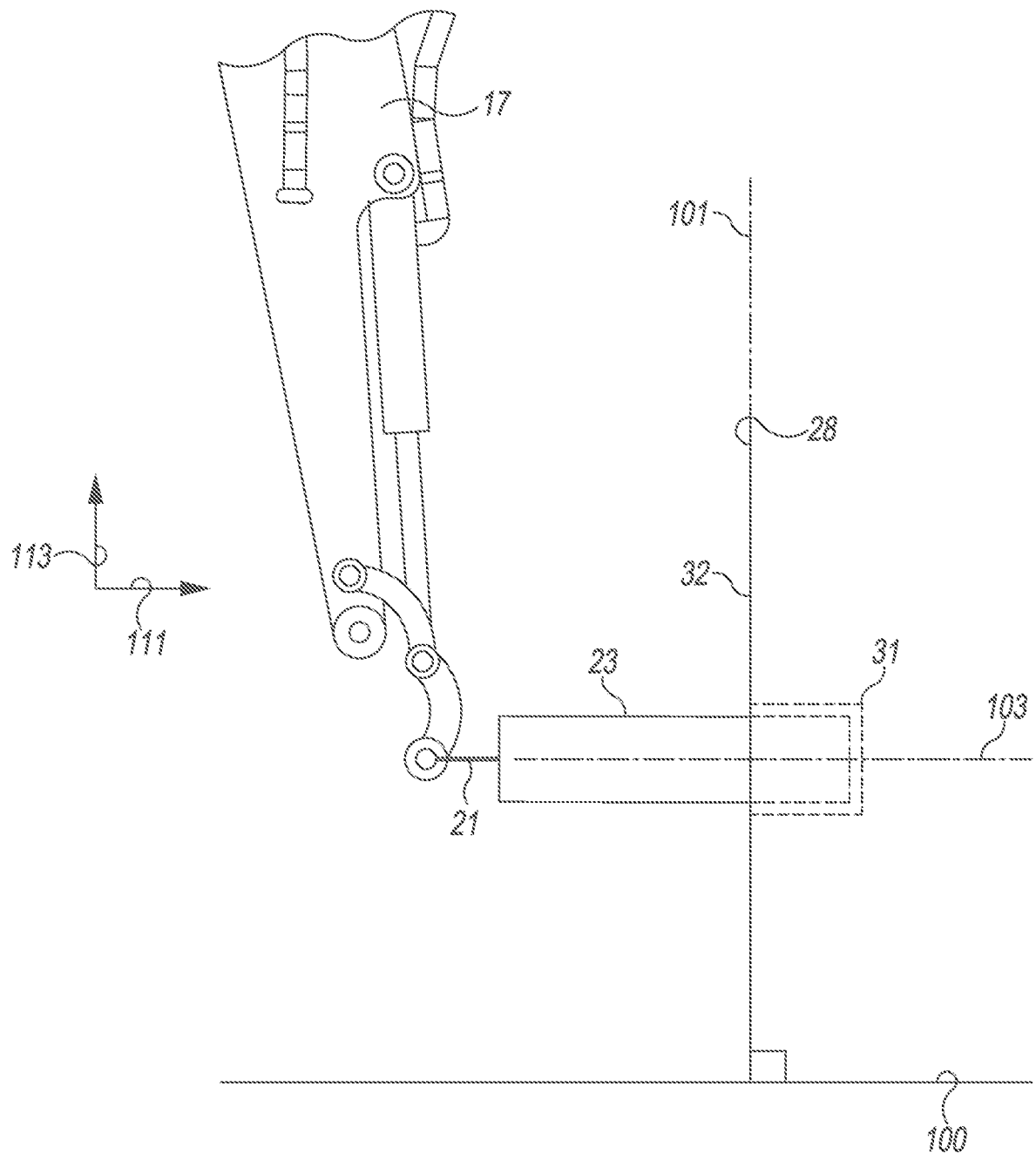
FIG. 5 is an enlarged fragmentary view of a moveable arm shown horizontally positioning a selectively shaped object at a third alternative object-receiver station in parallel to a station support surface.

Referencing FIG. 5, the reader will there consider a third alternative object-receiver station 28 comprising an upper station surface plane 101 that extends orthogonally relative to the station support surface 100. In the third alternative object-receiver station 28, the receiver axis 103 of the object-receiving structure 31 extends substantially parallel to the station support surface 100. It will thus be understood that the receiver axes 103 may alternatively extend in a select axial plane relative to the station support surface 100. In other words, the select axial plane preferably extends in a select angle relative to the station support surface 100, which select angle may be selected from the group consisting of a zero angle (as in the third alterative object-receiver station 28); an oblique angle (as in the second alterative object-receiver station 27); and an orthogonal angle (as in the preferred and first alternative object-receiver stations 25 and 26). Stated another way, the select axial plane (in which receiver axes 103 extend) is parallel to the station support surface 100 at the zero angle; the select axial plane is oblique to the station support surface 100 at the oblique angle; and the select axial plane is orthogonal to the station support surface 100 at the orthogonal angle.

Further alternative object-receiver stations are generally and comparatively depicted in FIGS. 8A through 8D. FIG. 8A depicts the preferred amusement game station 10 according to the present invention. Referencing FIG. 8A, the reader will note the preferred amusement game station 10 comprises an object-receiver station 25 having or comprising a generally rectangular or square shape in top plan view. A fourth alternative amusement game station 410 is depicted in FIG. 8B and comprises an object-receiver station 40 having a generally circular shape in top plan view. A fifth alternative amusement game station 510 is depicted in FIG. 8C and comprises an object-receiver station 50 having a generally triangular shape in top plan view.

FIG. 8D depicts an irregular shape for an object-receiver station 60 of a sixth alternative amusement game station 610. The object-receiver station 60 roughly resembles a lake-shaped object-receiver station in top plan view and the selectively shaped object-receiving structures 31 are depicted as being roughly boat-shaped in top plan view. In this regard, it is contemplated that the amusement game station according to the present invention may present or provide themed object-receiver stations and object-receiving structures as exemplified by a water body-shaped object-receiver station and boat-shaped object-receiving structures for receiving boat-shaped objects for enhancing the overall amusing effect of the inventive amusement game station according to the present invention.

Figure 7C:
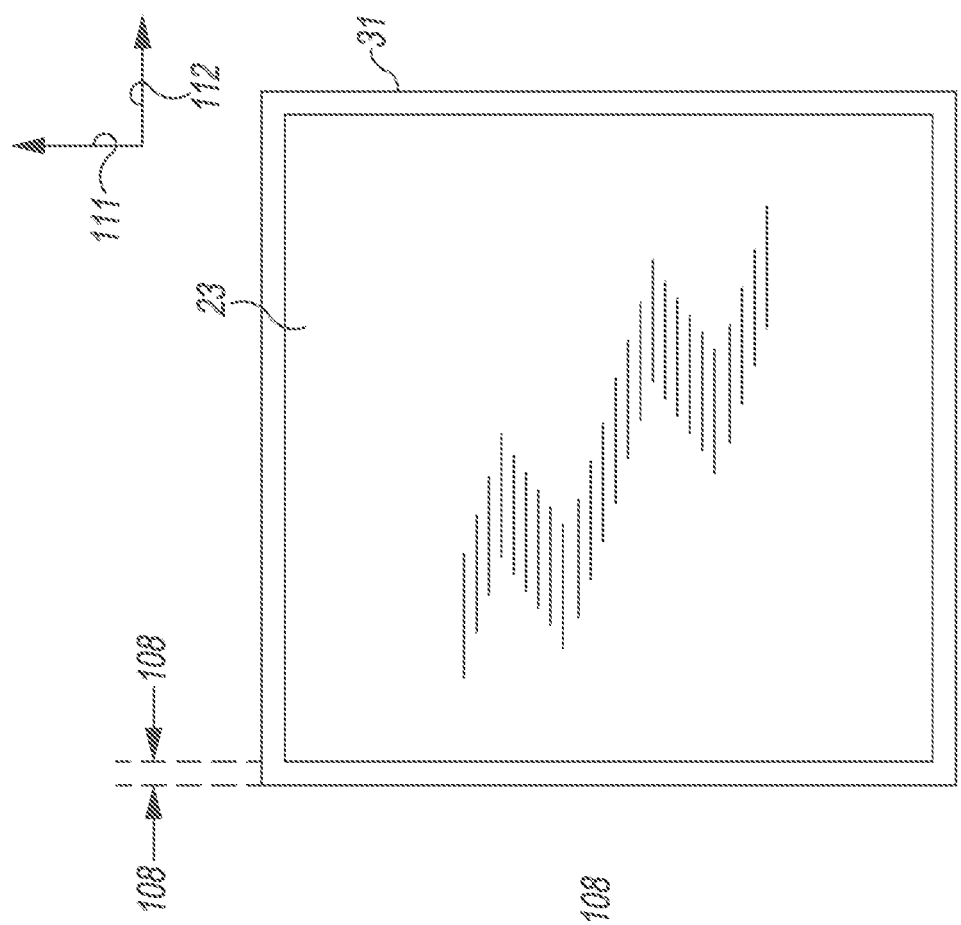
FIG. 7C is an enlarged sectional view as enlarged and sectioned from FIG. 7A to show in greater detail a second selectively shaped object centered and received in a second object-receiving structure of the preferred object-receiver station with uniform spacing between the second selectively shaped object and the second object-receiving structure.
Figure 7B:
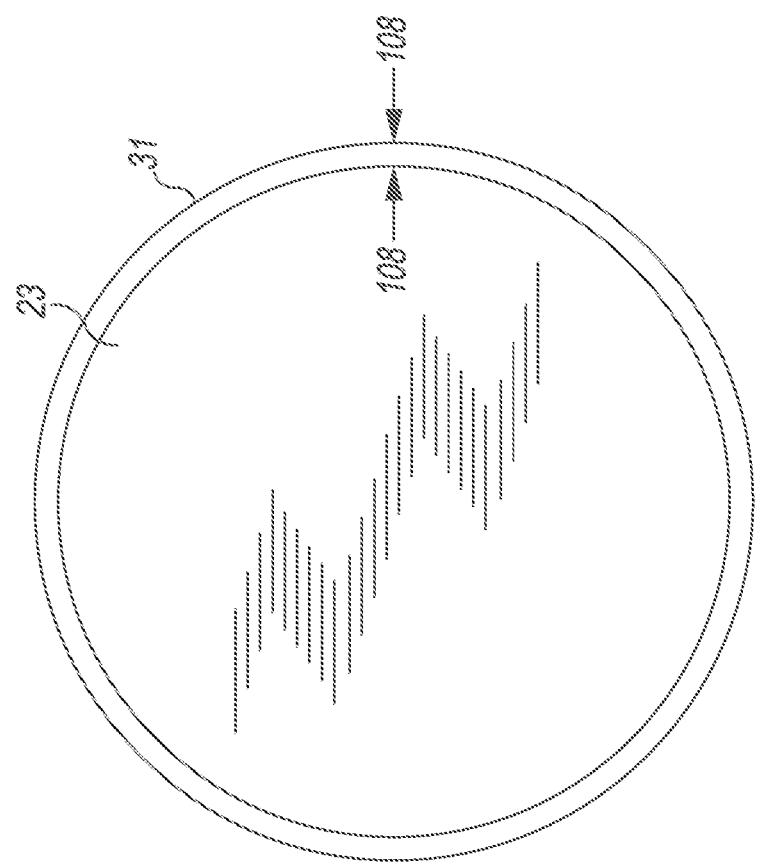
FIG. 7B is an enlarged sectional view as enlarged and sectioned from FIG. 7A to show in greater detail a first selectively shaped object centered and received in a first object-receiving structure of the preferred object-receiver station with uniform spacing between the first selectively shaped object and the first object-receiving structure.

Central to the practice of the invention is the two-dimensional shape of the selectively shaped objects 23 relative to the receiver axes 103 that generally extend orthogonally relative to the mouth of the object-receiving structures 31. In this regard, the reader may wish to reference FIGS. 7B and 7C as enlarged plan views of exemplary selectively shaped objects 23 received at object-receiving structures 31. Each of the selectively shaped objects 23 essentially comprise a select object size and a select object shape extending in a first dimension as at 111 and a second dimension as at 112. FIG. 7B, for example, shows a generally circularly shaped object 23 and FIG. 7C shows a generally rectangular or squarely shaped object 23.

While the two-dimensional size and shape of the selectively shaped objects 23 is believed essential, more complex amusement game stations are conceivable that would also require the participant to skillfully maneuver and position selectively shaped objects with regard to third dimensional 113 characteristics. Since directed movement of the selectively shaped objects 23 is generally in the third dimension 113 toward the object-receiving structures 31, the discussion here is limited to size and shape in the first and second dimensions 111 and 112. The object-receiving structures 31 each preferably comprise object-receiving sizes and shapes that correspond to the selectively shaped objects 23 such that the object-receiving structural size is greater than the select object size while the object-receiving structural shape is substantially similar to the select object shape.

It will be seen that when the selectively shaped objects 23 are centered relative to the object-receiving structures 31, a peripheral space 108 extends about the selectively shaped objects 23 between outer surfacing thereof and inner surfacing of the object-receiving structures 31. This peripheral space 108 is preferably on the order of 1-2 inches so as to enhance receipt of the selectively shaped objects 23 at the object-receiving structures 31. It is contemplated that the peripheral space 108 can be increased or decreased so as to alter the skill level required for any given amusement game station. With the foregoing having been described, the reader will further bear in mind that any number of shapes and sizes of the object-receiving stations and selectively shaped objects is contemplated, including basically shaped objects and stations as well as irregularly shaped objects and stations. The examples illustrated and described should not be construed as limiting, but as exemplary so as to more properly convey the structural concepts.

The object-receiver stations according to the present invention may be still further alternatively presented opposite the complex machine component 11. In this regard, the reader is firstly directed to FIGS. 6A through 6C. Comparatively referencing FIGS. 6A through 6C, the reader will there consider that a series of object-receiver or object-placement stations may be presented opposite the complex machine component. FIGS. 6A through 6C attempt to depict barrel-type object-receiver stations 29, each of which have an upper station surface plane 101 parallel to the station support surface 100, but at differing heights 104, 105, and 106 relative to the station support surface 100. In this series of figures, the barrel-shaped object-receiver stations 29 are each outfitted with a single, uniquely shaped object-receiving structure 31 and are supported by a station support surface 100 outfitted with a grass-like material 34 in keeping with the concept of outfitting the amusement game station with themed components.

Figure 9A:
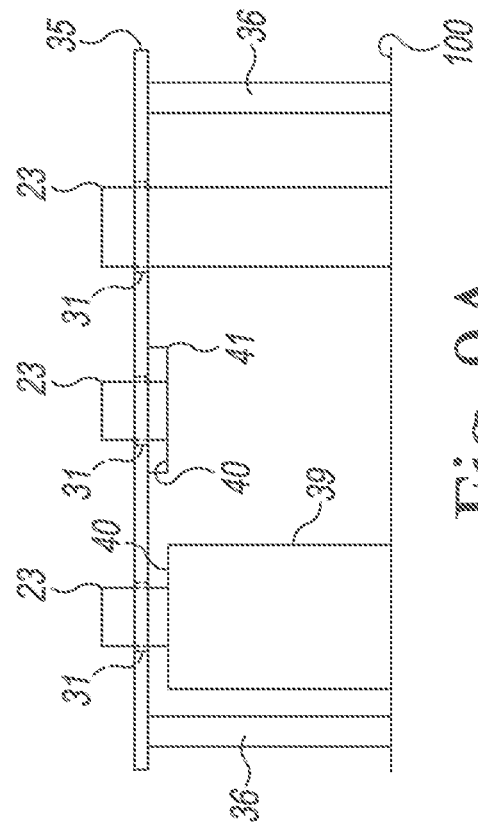
FIG. 9A is a side elevational schematic type view of a floor-supported object-receiver station or platform shown outfitted with a series of alternative selectively shaped object support structures, including the station support surface.
Figure 9B:
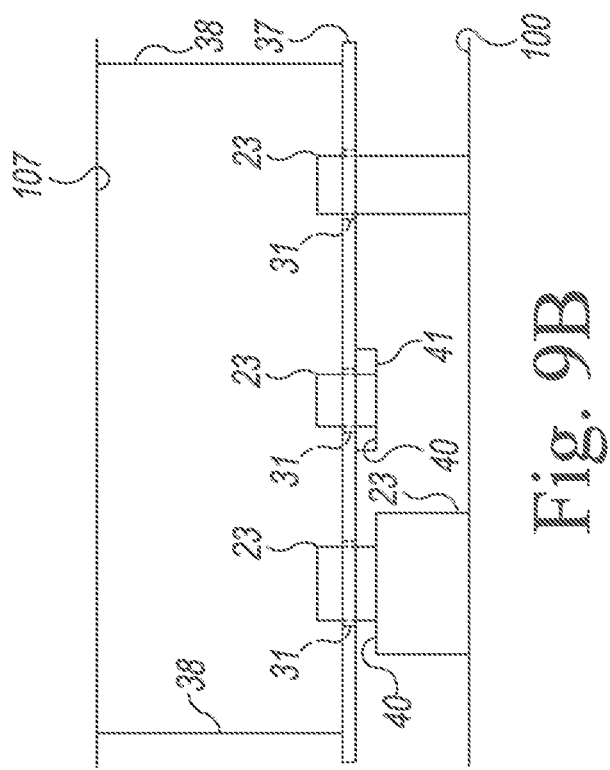
FIG. 9B is a side elevational schematic type view of a ceiling-supported object-receiver station or platform shown outfitted with a series of alternative selectively shaped object support structures, including the station support surface.
Figure 9C:
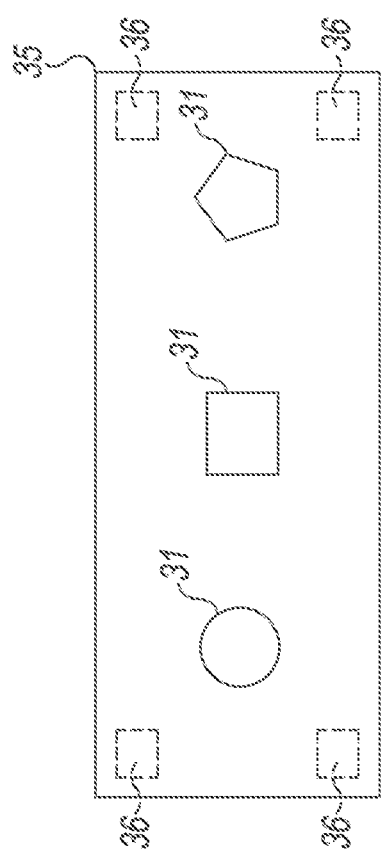
FIG. 9C is a top plan view of the floor-supported object-receiver station or platform otherwise depicted in FIG. 9A showing a series of differently shaped object-receiving apertures formed in the floor-supported object-receiver station.
Figure 9D:
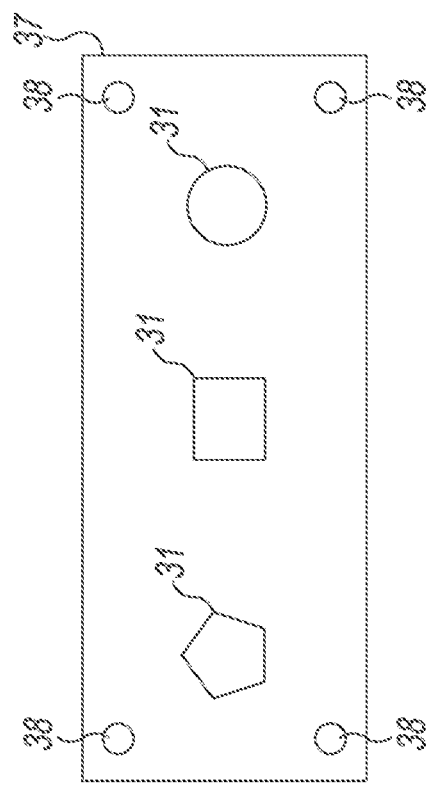
FIG. 9D is a top plan view of the ceiling-supported object-receiver station or platform otherwise depicted in FIG. 9B showing a series of differently shaped object-receiving apertures formed in the ceiling-supported object-receiver station.

Comparatively referencing FIG. 9A versus FIG. 9B the reader will there consider two additional variations on the object-receiver station concept according to the present invention. FIG. 9A depicts a floor-supported object-receiver platform or station as at 35, which object-receiver platform or station 35 is supported by posts 36 or similar other compression members intermediate the station 35 and the station support surface 100. FIG. 9B depicts a suspended object-receiver station or platform 37. Tensile members or tethers 38 are attached to the object-receiver platform or station 37 and an overlying support structure 107 exemplified by a ceiling to suspend the object-receiver station 37 above the station support surface 100. Object-receiving structures 31 exemplified by apertures are formed in the object-receiver stations 35 and 37 and are sized and shaped to allow selectively shaped objects 23 to be inserted therein. FIGS. 9C and 9D are top plan views of the object-receiver stations 35 and 37 respectively with the selectively shaped objects 23 removed.

It will be further seen from a comparative inspection of FIGS. 9A and 9B that the selectively shaped objects 23 may be variously supported at the object-receiver stations 35 and 37. In this regard, a raised compression type support member 39, supported by the station support surface 100, may provide a support surface 40 for supporting the selectively shaped object(s) 23. Alternatively, a suspended object-support platform 41, suspended from the object-receiver stations 35 and/or 37, may provide a support surface 40 for supporting the selectively shaped object(s) 23. Further, the station support surface 100 itself may provide the support surface for supporting the selectively shaped object(s) 23.

Figure 11:
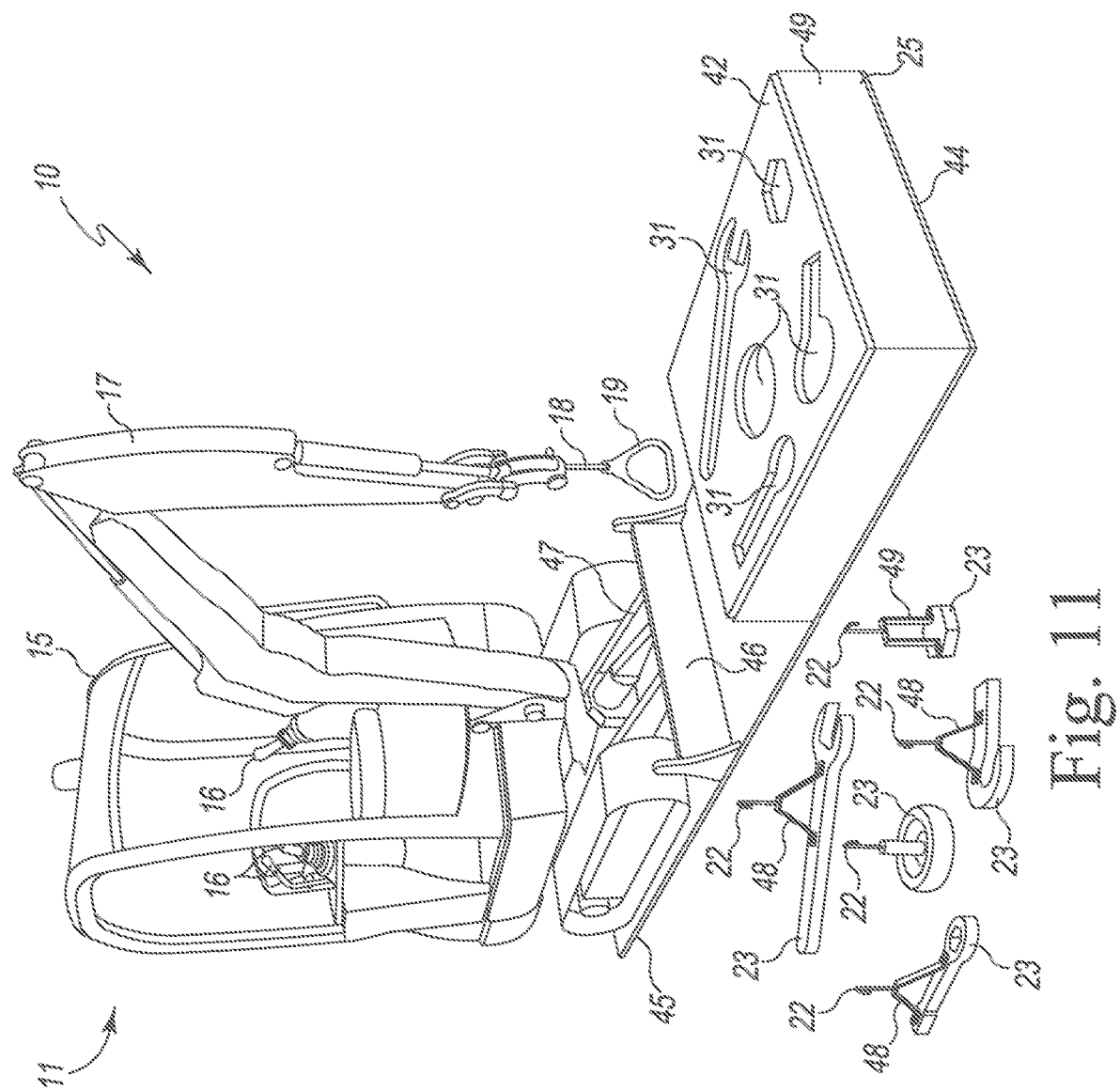
FIG. 11 is a perspective view of a preferred amusement game station according to the present invention showing a complex machine and an object-receiver station supported by a station platform.

In a preferred embodiment, as illustrated in FIG. 11, the reader will see that an apertured upper form or overlay structure 42 may be peripherally formed to be similarly shaped as a form-supporting pedestal 49 in top plan view. The apertures or cavities formed in the form or overlay structure 42 define the object-receiving structures 31 and the top surface of the pedestal 49 provides the support surface 40. In this regard, it is contemplated that different forms or overlay structures 42, outfitted with differently sized and shaped apertures or object-receiving structures 31, may be interchanged with a first form or overlay structure 42 thereby enabling a single amusement game station to be alternatively outfitted for receiving various selectively shaped objects 23 with varying sizes. The object-receiver station according to the present invention may preferably comprise a series of object-receiving structures 31 spaced from one another within an object-receiving overlay structure 42. The object-receiving overlay structure or form 42 is supported by an object support platform or pedestal as at element 49. A first surface of the object support platform 49 provides an object support surface 40 at each object-receiving structure 31.

The preferred and alternative object-receiver stations according to the present invention are preferably affixed or anchored to a station platform as at 43. The station platform 43 may further preferably comprise a receiver station portion as at 44 and a machinery support portion as at 45. The receiver station portion 44 essentially functions to support the object-receiver station(s) exemplified by object-receiver station 25 and the machinery support portion 45 essentially functions to support the complex machine component exemplified by complex machine 11. The station platform 43 may further preferably comprise a fixedly attached portion divider as at 46.

The fixedly attached portion divider 46 extends upwardly intermediate the receiver station portion 44 and the machinery support portion 45 for preventing the complex machine 11 from being inadvertently directed into the object-receiver station 25. The complex machine 11 may be preferably coupled or anchored to the fixedly attached portion divider 46 by anchor members 47 thereby further fixing or anchoring the complex machine 11 to the station platform 43. The station platform 43 may be further preferably fixedly attached to the underlying anchor or station support surface 100 thereby fixing the amusement game station 10 and its alternatives to the underlying station support surface 100. In this last regard, it is contemplated that the station platform 43 may be bolted to the underlying station support surface 100 in the preferred embodiment.

While the above descriptions contain much specificity, this specificity should not be construed as limitations on the scope of the invention, but rather as an exemplification of the invention. In certain alternative embodiments, the basic invention may be said to essentially teach or disclose an amusement activity or game station for enabling a user to operate complex machinery to pick up and position selectively shaped objects in a safe and amusing manner. The amusement activity or game station according to the present invention is believed to essentially comprise a complex machine, at least one object-receiver station opposite the complex machine and at least one, but preferably a series of selectively shaped objects.

The complex machine preferably and essentially comprises a user position station, a user-to-machine interface, a moveable member, and a pick-up mechanism for picking up at least one selectively shaped object. The moveable member is directable or movable relative to the user position station by way of the user-to-machine interface as manually operated by the user. Each object-receiver station comprises at least one object-receiving structure. The moveable member is directable for firstly picking up the selectively shaped objects by way of the pick-up mechanism and secondly directing the selectively shaped objects toward the at least one object-receiving structure. The object-receiving structures are sized and shaped to cooperably receive the selectively shaped objects.

In a preferred embodiment, the pick-up mechanism may be characterized by a loop member, but other pick-up mechanisms are contemplated. The loop member is attached to the moveable member, and is operable to couple with hook members cooperably associated with the selectively shaped objects. Further, the preferred embodiment may preferably comprise a single object-receiver station outfitted with a number or series of object-receiving structures spaced and formed within an object-receiving overlay structure. The object-receiving overlay structure is preferably supported by an object support platform or pedestal. A first or upper surface of the object support platform or pedestal provides an object support surface at each object-receiving structure in this embodiment.

Each object-receiving structure at the object-receiver station(s) comprises a receiver axis that generally corresponds to the vectored direction of final object placement. The receiver axis of each object-receiving structure extends in a select angle relative to a station support surface. The select angle may be said to be selected from the group consisting of a zero angle, an oblique angle, and an orthogonal angle. The select angle is parallel to the station support surface at the zero angle; the select angle is oblique to the station support surface at the oblique angle; and the select angle is orthogonal to the station support surface at the orthogonal angle. The selectively shaped objects may be directed and received at various angles as supported by the object-receiver stations according to the present invention.

The selectively shaped objects each essentially comprise a select object size and a select object shape in first and second dimensions. The object-receiving structures comprise corresponding select object-receiving shapes and select object-receiving sizes. The select object-receiving sizes are greater than the select object sizes, and the select object-receiving shapes are substantially similar to the select object shapes. The user participant may thus direction the selectively shaped objects toward the receiver station(s) and each selectively shaped object may be preferably associated with a singular object-receiving structure at the object-receiver station. The sizing of the variously shaped object-receiving structures may be tailored to increase or decrease skill level of object placement at the object-receiver stations.

The object-receiver stations according to the present invention may be variously configured for receiving the selectively shaped objects. For example, a series of object support surfaces may be provided, which series of object support surfaces are variously distanced from a station support surface. Alternatively, a series of object-receiver stations may be provided, each of which may comprise one or more object support surface. The object support surfaces of the series of object-receiver stations may be variously spaced or uniformly spaced from a station support surface. The object-receiver stations may be suspended above a station support surface. In the case of a suspended object-receiver station, the station may be suspended by a series of tensile elements from an object-receiver station ceiling.

The station platform may further preferably comprise a fixedly attached portion divider. The fixedly attached portion divider extends upwardly intermediate a receiver station portion and a machinery support portion for preventing the complex machinery from being inadvertently directed into the object-receiver station. The complex machine is preferably coupled or anchored to the fixedly attached portion divider thereby fixing the complex machine in position relative to the station platform. The station platform is further preferably fixedly attached or anchored to an underlying anchor support surface for fixing or anchoring the entire amusement game station to the underlying anchor support surface.

The foregoing embodiments illustrate the principles, preferred or example embodiments, and modes of assembly and operation, of the invention. It is noted, however, the invention is not, and shall not be construed as being exclusive or limited to the specific or particular embodiments herein. Moreover, certain specific or particular embodiments herein have been expressly designated optional, and thus the invention includes the invention with, or without, any or all embodiments herein expressly designated as optional.

Accordingly, all embodiments herein should be regarded as illustrative rather than exclusive or limiting, and variations to embodiments herein may be made without departing from the invention scope. In other words, although the amusement game station according to the present invention have been described by reference to a number of different embodiments, it is not intended that the novel combinations or assemblies be limited thereby, but that modifications thereof are intended to be included as falling within the broad scope and spirit of the foregoing disclosure, the appended drawings, and perhaps most importantly, the following claims.

What is claimed is:

1. An amusement activity station, the amusement activity station for enabling a user to operate complex machinery to pick up and position selectively shaped objects, the amusement activity station comprising:
a complex machine, the complex machine comprising a user position station, a user-to-machine interface, a moveable member, and a pick-up mechanism for picking up at least one selectively shaped object, the moveable member being movable relative to the user position station by way of the user-to-machine interface as manually operated by the user; and
at least one object-receiver station in spaced relation to the complex machine, the at least one object-receiver station comprising a plurality of object-receiving structures, the plurality of object-receiving structures being spaced from one another;
the moveable member being directable for picking up the at least one selectively shaped object by way of the pick-up mechanism and directing the at least one selectively shaped object toward the at least one object-receiver station;
each object-receiving structure being configured to cooperably receive at least one selectively shaped object and comprising an object support surface, the object support surfaces of the plurality of object-receiving structures being variously spaced from a station support surface.

2. The amusement activity station of claim 1 wherein the pick-up mechanism is characterized by a loop member, the loop member being attached to the moveable member, the loop member for coupling with a hook member associated with the at least one selectively shaped object.

3. The amusement activity station of claim 2 wherein the at least one selectively shaped object comprises a bifurcated interface element, the bifurcated interface element coupling the hook element to the at least one selectively shaped object, the bifurcated interface element for improving balance of the at least one selectively shaped object relative to the hook element.

4. The amusement activity game station of claim 1 wherein each object-receiving structure comprises a receiver axis, the receiver axis of each object-receiving structure extending in a select angle relative to a station support surface, the select angle being selected from the group consisting of a zero angle, an oblique angle, and an orthogonal angle, the select angle being parallel to the station support surface at the zero angle, the select angle being oblique to the station support surface at the oblique angle, and the select angle being orthogonal to the station support surface at the orthogonal angle.

5. The amusement activity station of claim 1 wherein the at least one selectively shaped object comprises a select object size and a select object shape in first and second dimensions, each object-receiving structure comprising a select object-receiving shape and a select object-receiving size, the select object-receiving size being greater than the select object size, the select object-receiving shape being substantially similar to the select object shape.

6. The amusement activity station of claim 1 wherein the at least one object-receiver station is suspended above a station support surface, the object-receiver station being suspended by a series of tensile elements from an object-receiver station ceiling.

7. An amusement activity station, the amusement activity station for enabling a user to operate complex machinery to pick up and position select objects, the amusement activity station comprising:
a complex machine, the complex machine comprising a user position station, a user-to-machine interface, and a pick-up mechanism for picking up at least one select object, the pick-up mechanism being movable relative to the user position station by way of a manual operation of the user-to-machine interface; and
at least one object-receiver station in spaced relation to the complex machine, the at least one object-receiver station comprising at least one object-receiving structure;
each object-receiving structure comprising a receiver axis, the receiver axis of each object-receiving structure extending in a select angle relative to a station support surface;
the select angle being selected from the group consisting of an oblique angle, and a zero angle, the select angle being oblique to the station support surface at the oblique angle and the select angle being parallel to the station support surface at the zero angle;
the pick-up mechanism being directable for picking up the at least one select object by way of the pick-up mechanism and directing the at least one select object toward the at least one object-receiving structure, the at least one object-receiving structure being configured to cooperably position the at least one select object.

8. The amusement activity station of claim 7 wherein the pick-up mechanism is characterized by a moveable member with an end piece, the end piece for coupling with a portion of the at least one select object.

9. The amusement activity station of claim 7 wherein the at least one object-receiver station comprises a series of object-receiving structures.

10. The amusement activity station of claim 9 wherein the series of object-receiving structures are characterized by aperture formations within a first object-receiving overlay structure, the first object-receiving overlay structure being supported by an object support pedestal.

11. The amusement activity station of claim 10 wherein a series of secondary object-receiving overlay structures are available as replacements to the first object-receiving overlay structure.

12. The amusement activity station of claim 9 wherein the at least one object-receiver station comprises a series of object support surfaces, the series of object support surfaces being variously distanced from a station support surface.

13. The amusement activity station of claim 7 comprising a series of object-receiver stations, each object-receiver station comprising an object support surface, the object support surfaces of the series of object-receiver stations being variously spaced from a station support surface.

14. The amusement activity station of claim 7 wherein the at least one object-receiver station is suspended above a station support surface, the object-receiver station being suspended by a series of tensile elements from an object-receiver station ceiling.

15. The amusement activity station of claim 7 wherein the at least one select object comprises a bifurcated interface element, the bifurcated interface element being matable with the end piece and improving balance of the at least one select object relative to the end piece.

* * * * *